United States Patent [19]
Astengo

[11] 3,715,718
[45] Feb. 6, 1973

[54] GROUND PROXIMITY WARNING SYSTEM UTILIZING RADIO AND BAROMETRIC ALTIMETER COMBINATION

[75] Inventor: Ralph A. Astengo, Redmond, Wash.
[73] Assignee: Sundstrand Data Control, Inc.
[22] Filed: Aug. 11, 1970
[21] Appl. No.: 62,861

[52] U.S. Cl. ................340/27 R, 340/213 R, 330/31
[51] Int. Cl. ..............................................G01c 5/00
[58] Field of Search........340/27 R, 37 NA, 26, 12 A, 340/112 A

[56] References Cited

UNITED STATES PATENTS

| | | | |
|---|---|---|---|
| 3,093,807 | 6/1963 | Crane | 343/12 A |
| 2,931,221 | 5/1960 | Rusk | 343/112 A |
| 3,140,483 | 7/1964 | Sikora | 343/112 A |
| 3,077,557 | 2/1963 | Joline | 340/27 R |
| 2,735,081 | 2/1956 | Hosford | 340/27 NA |

OTHER PUBLICATIONS

Philbrick/Nexus Research, Applications Manual for Operational Amplifiers, P. 46, 1968.

*Primary Examiner*—Kathleen H. Claffy
*Assistant Examiner*—Jon Bradford Leaheey
*Attorney*—Hofgren, Wegner, Allen, Stellman & McCord

[57] ABSTRACT

A ground proximity warning system for an aircraft which produces a warning signal when the rate of descent of the aircraft exceeds a limiting value determined by the aircraft altitude. The rate of descent of the aircraft is calculated from a combination of measurements of the altitude of the aircraft above ground and the barometric altitude of the aircraft. A signal representing the rate of change of the altitude of the aircraft above ground is limited, to minimize false warnings as a result of surface irregularities. The barometric portion of the system is disabled during take-off run and the initial portion of the aircraft climb-out to avoid a false warning resulting from an increased barometric pressure condition during this maneuver. The limits on the aircraft altitude rate signal are modified in accordance with the flight mode of the aircraft, to reduce the sensitivity of the warning system during the final stage of a landing approach.

The warning system provides an alarm to the pilot which is an audio tone modulated at a low frequency repetition rate. A soft warning is actuated when the sink rate of the aircraft exceeds a desired level for the altitude at which the aircraft is operating. If the aircraft is also below a limiting altitude, a hard warn signal is provided. The repetition rate of the warning signal, while in a soft warn condition, is a function of the difference between the altitude of the aircraft and the altitude at which the sink rate would be proper.
A complementary filter with which the altitude rate signals are combined, includes an operational amplifier connected in an unloading amplifier configuration with a resistive circuit connecting one input signal with the amplifier and a capacitive circuit connecting the other input signal with the amplifier, the resistive and capacitive input circuits forming a low pass filter for the first signal and a high pass filter for the second signal.

17 Claims, 9 Drawing Figures

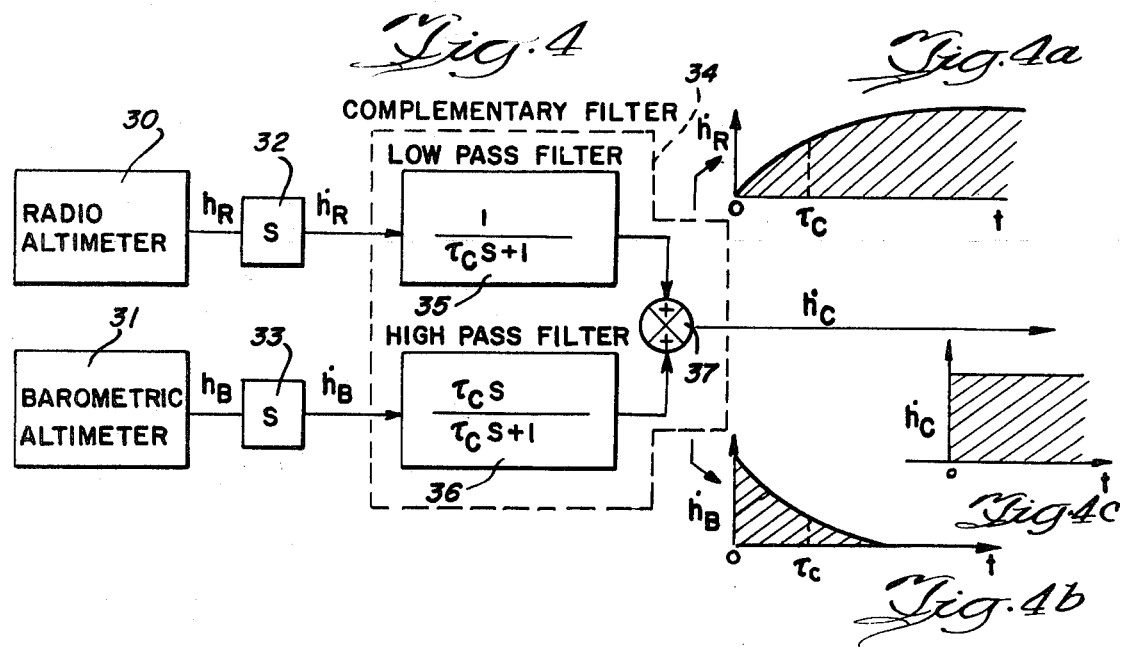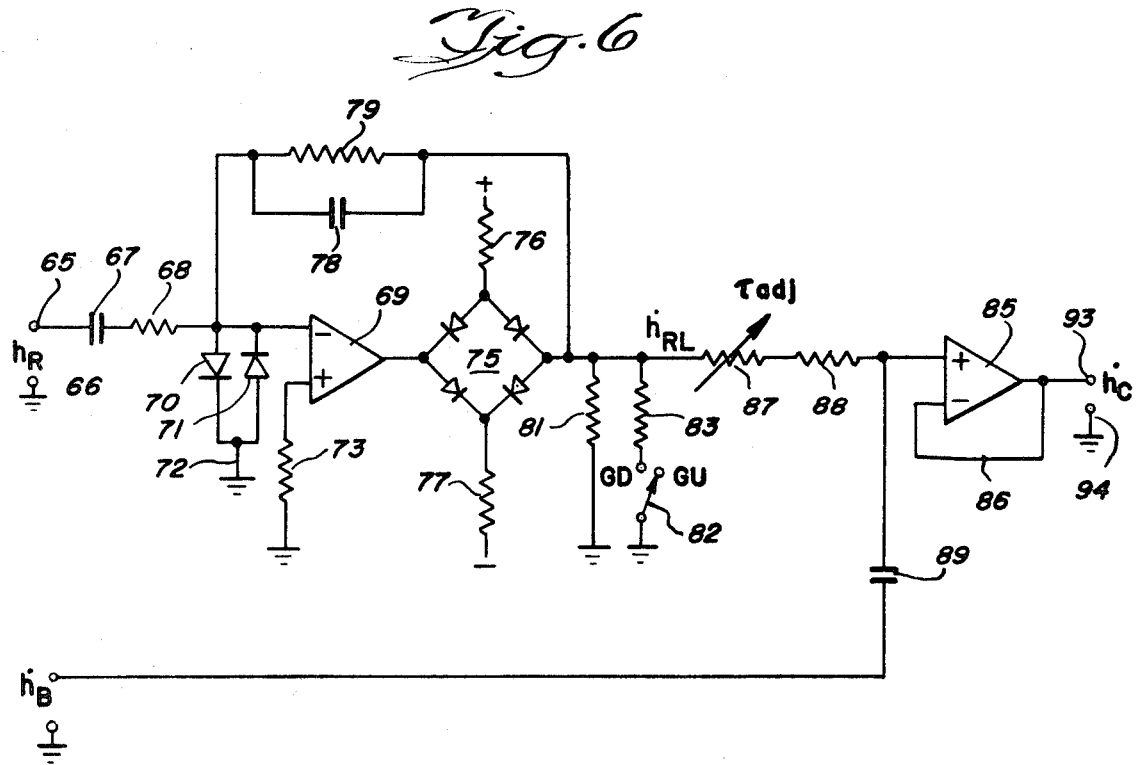

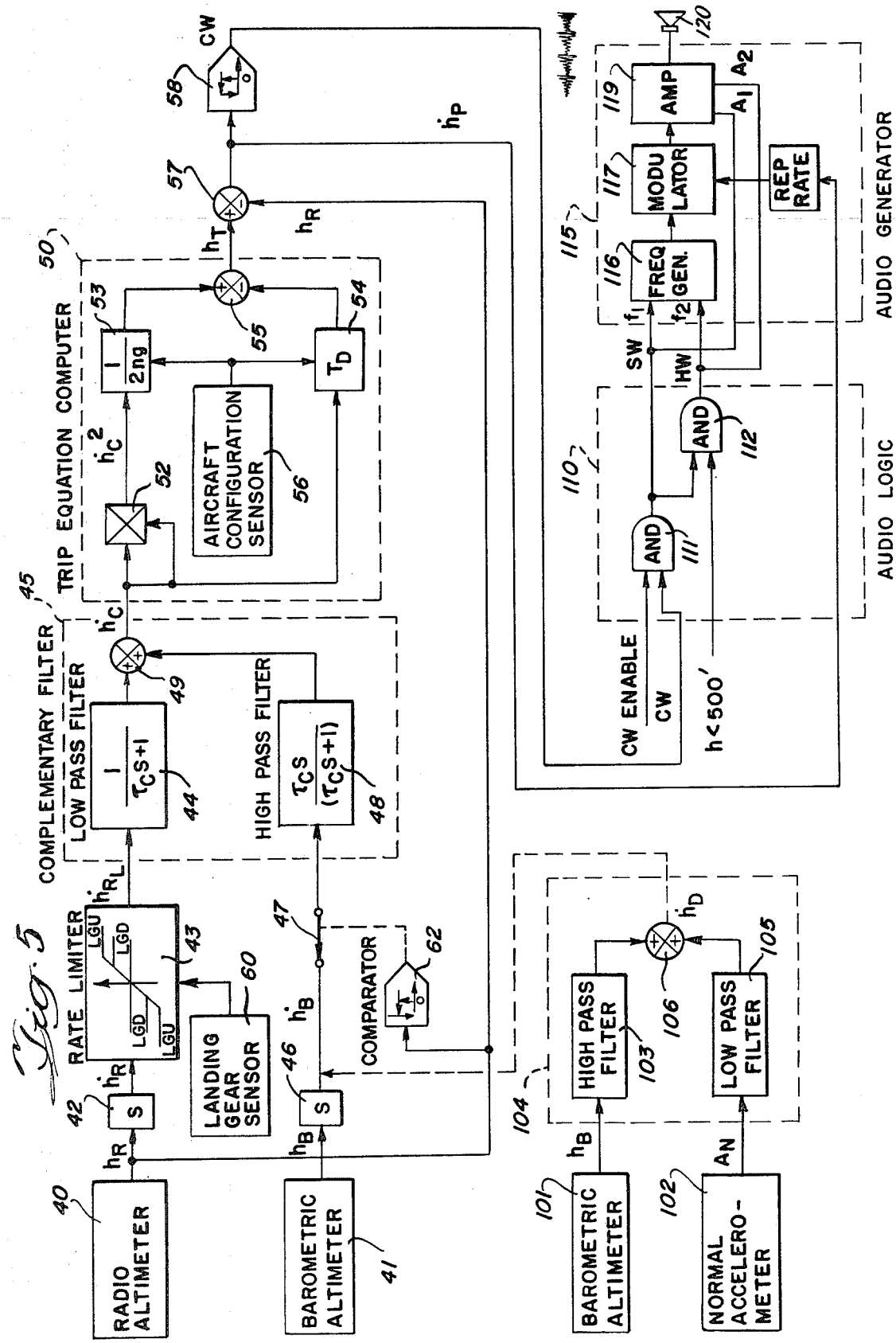

GROUND PROXIMITY WARNING SYSTEM UTILIZING RADIO AND BAROMETRIC ALTIMETER COMBINATION

This invention is concerned with an instrument for indicating to the pilot a condition of proximity to the ground which requires correction; i.e., the movement of an aircraft into a relationship with the ground which might result in a crash unless the pilot executes a climb. It has been proposed that such a warning be generated in accordance with a combination of aircraft altitude and altitude rate. It will be recognized, for example, that an aircraft at an altitude of a thousand feet above the ground can descend safely at a more rapid rate than an aircraft at one hundred feet. Systems which have been proposed have been unsuccessful primarily as a result of the lack of a satisfactory measure of aircraft rate of change of altitude.

Instruments are available to measure the altitude of an aircraft above the ground, as radio altimeters, and the output of a radio altimeter can be differentiated to obtain a signal representing the rate of change of aircraft altitude with respect to the ground. Such a signal is satisfactory as long as the ground surface is relatively smooth. Where, however, the ground is irregular or the aircraft flies over large buildings, trees or the like, altitude rate signals are generated which cause false warnings. It is also known to measure the altitude of an aircraft barometrically with respect to a fixed reference, as sea level. The output of a barometric instrument may be differentiated to obtain a signal representing the barometric rate of change of altitude of the aircraft. Such a signal is satisfactory in a ground proximity warning system as long as the ground is relatively flat. However, if the ground over which the aircraft operates is rising, for example, no warning will be given even though the aircraft flies into the ground.

Attempts to filter the signal representing rate of change of altitude with respect to the ground, to remove the high frequency components, have been unsuccessful in reducing the problem of false warnings. If the filter time constant is large enough to eliminate the high amplitude signals from ground irregularities, the system responds so slowly to changes in the aircraft altitude that it is unsatisfactory.

I have found that the false warnings can be significantly reduced, if not completely eliminated, without impairing the sensitivity of the system, by limiting the amplitude of the signal representing the rate of change of altitude with respect to the ground.

One feature of the invention is the provision of means for generating a signal representing the aircraft altitude rate of change, for use in an instrument for determining the proximity condition of the aircraft with respect to ground, including means for measuring the altitude of the aircraft with respect to the ground, means responsive to the output of the altitude measuring means for deriving a signal representing the time rate of change of aircraft altitude and means for limiting the amplitude of the aircraft altitude rate signal, reducing sensitivity of the instrument to irregularities of the ground surface.

Another feature of the invention is that the amplitude limit of the altitude rate signal is adjusted as a function of the flight mode of the aircraft. For example, if a cruising aircraft unintentionally approaches the ground, it is desirable that a warning be given as soon as this relation to the ground reaches a predetermined condition from which it can readily climb to a safer altitude. However, when the aircraft is on a landing approach, intentionally approaching the ground, the amplitude of the altitude rate signal is limited to a lower level to avoid unnecessary false warnings.

A further feature of the invention is that the limited altitude rate signal is combined with a signal representing the rate of change of the barometric aircraft altitude, in a complementary filter which selects the low frequency or long term components of the limited rate signal and the short term, high frequency components of the barometric rate signal. The calculated altitude rate signal from the filter has a high degree of accuracy while eliminating inaccuracies due to ground irregularity and from offsets and drift of the barometric altimeter.

Yet another feature of the invention is the provision in a ground proximity instrument utilizing a means responsive to air pressure for measuring barometric altitude of the aircraft of a means for disabling the altitude measuring means during take-off and the initial portion of the climb-out. During the take-off run of an aircraft the air around it tends to compress as it is forced between the plane and the surface of the runway. This results in a low reading on a barometric altimeter and a rate signal which shows that the plane is descending although it is still on the ground. Accordingly, the barometric altimeter cut-out avoids the occurrence of a false warning.

And a further feature of the invention is the utilization of a signal from a normal accelerometer either in place of or to complement the barometric altitude rate signal, providing dynamic altitude rate information for combination with the signal representing the time rate of change of measured altitude with respect to ground.

Another feature of the invention is the provision of a system for warning a machine operator of an undesired operating condition including means establishing first and second warning criteria and means responsive to each criteria for establishing first and second alarms. If the operator does not react to the first warning, the occurrence of the second warning should demand a response.

Still a further feature of the invention is the provision of means for measuring the difference between the operating condition of the machine and a boundary between desired and undesired operating condition. A characteristic of the alarm is varied as a function of this difference. More particularly, an audible alarm is modulated at a repetition rate which is varied as a function of the difference between the operating condition and the boundary.

And another feature of the invention is the provision of a complementary filter utilizing an operational amplifier having a feedback circuit between the output and the negative input, for operation of the amplifier as an unloading amplifier. A resistive circuit connects one signal source with the positive input while a capacitive input connects a second signal source with the positive amplifier input. The resistive and capacitive circuits form a low pass filter for the signal from the first source and a high pass filter for the signal from the second source. The time constant of both filters may be varied by simply adjusting the resistance of the resistive circuit.

Further features and advantages of the invention will readily be apparent from the following specification and from the drawings, in which:

FIG. 4 is a functional block diagram of a system embodying the invention for computing an altitude rate signal for the warning system of FIG. 3;

FIGS. 4a, 4b and 4c illustrate the signal-amplitude-frequency characteristics of the complementary filter of FIG. 4.

FIG. 5 is a functional block diagram of a preferred form of the ground proximity warning system embodying the invention; and FIG. 6 is a schematic diagram of a circuit for the altitude rate limiter and the complementary filter.

The ground proximity warning system disclosed herein is based on criteria that have been proposed by others, but which have not previously been successfully utilized. Briefly, the warning criteria are aircraft altitude with respect to the ground and the rate of change of altitude. When these two factors have a certain relation, as will appear, the pilot is given a warning that he should execute a pull-up maneuver, causing the aircraft to climb. The principal problem in utilizing such a warning has been an inability to generate a satisfactory signal representing the rate of change of aircraft altitude. Two basic measures of aircraft altitude are available. One is a measure of the distance between the aircraft and the ground. This measurement is commonly made by a radio altimeter or "down looking" radar which measures the transit time of a radio signal generated in the aircraft and reflected from the ground. The other is barometric altitude based on the pressure of the air through which the aircraft moves.

The radio altimeter is sensitive to minor irregularities in the earth's surface and to objects such as trees, buildings and the like. If the ground were smooth, the radio altimeter rate signal would provide a suitable basis for a ground proximity warning system. However, this is generally not the case and the rate signal obtainable in practice causes false warnings as a result of the ground surface irregularities. The rate signal derived from the output of a barometric altimeter provides accurate information regarding the descent or climb of the aircraft, and if the airplane were operating over flat ground, the barometric rate signal would be satisfactory. Where, however, the ground is not flat, and particularly where it slopes upwardly, the barometric altitude rate signal alone is not sufficient for reliable operation.

The combination of an amplitude limited radio altimeter rate signal and a barometric altimeter rate signal provides a calculated or synthetic altitude rate signal which has the ground referenced accuracy of the radio altimeter and the dynamic reliability of the barometric altimeter. A ground proximity warning system utilizing the calculated altitude rate signal is free of false warnings yet provides ample warning of a situation which requires pilot action.

The novel means for generating an altitude rate signal and other features of the invention are described as a part of a warning system which is based on the assumption of certain flight conditions and aircraft operating characteristics. This specific warning system provides a suitable background for an understanding of the invention. However, the altitude rate signal generator and other features of the invention could be used in warning or control systems based on other conditions and characteristics.

Figure 1:
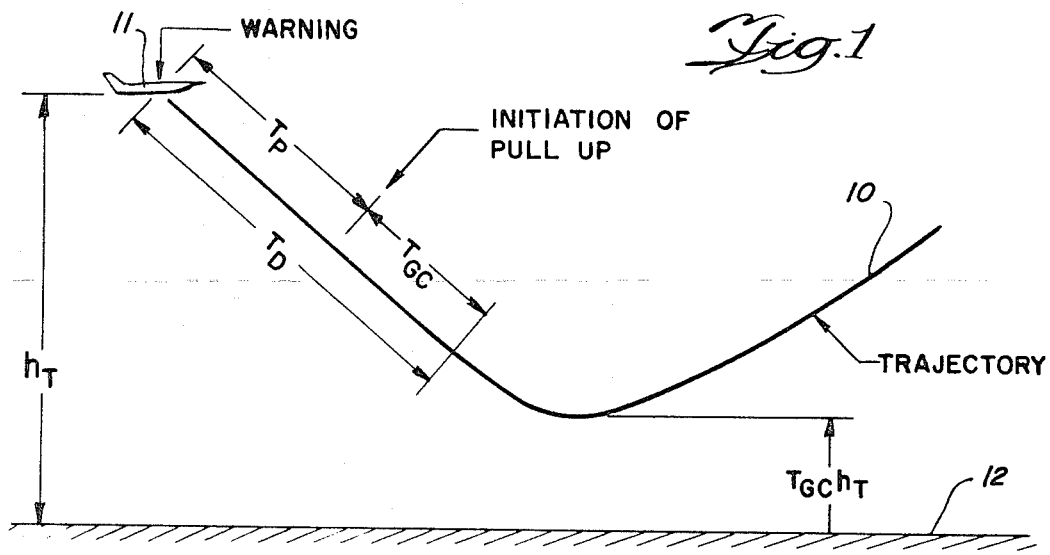
FIG. 1 is a curve representing the trajectory of an aircraft in a situation of recovery from a ground proximity warning.
Figure 2:
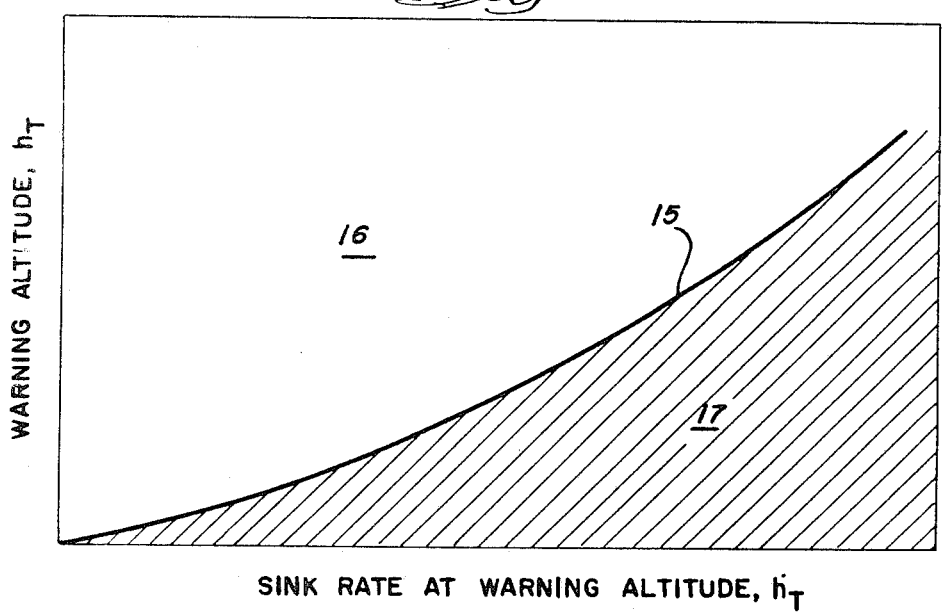
FIG. 2 is a plot of warning altitude as a function of the sink rate of the aircraft for a representative ground proximity warning system.

FIGS. 1 and 2 illustrate the basis for the warning criteria utilized in the system disclosed herein. The curve of FIG. 1 shows the trajectory 10 of an aircraft 11 during an approach toward the ground 12 and a climb following the occurrence of a warning and the execution of a pullup maneuver by the pilot. Assume that the airplane 11 in FIG. 1 is at an altitude, $h$, of 500 feet and descending at a rate of 40 feet per second. This is a negative rate of change of altitude, $\dot{h}$, sometimes referred to as the sink rate of the aircraft. A ground proximity warning is given to the pilot who waits for 8 seconds $T_D$ whereupon he initiates a pull-up maneuver. The pull-up is executed so as to exert an accelerating force of 0.1 g on the aircraft. g is the acceleration due to gravity. Under these conditions, the aircraft would just touch the ground at the low point of its trajectory.

It would be unusual for a pilot to delay 8 seconds before initiating the pull-up maneuver, following occurrence of a warning signal. Furthermore, a pull-up of 0.1 g is a mild maneuver, significantly less severe than that which a pilot would normally execute in a situation where a warning of ground proximity is received. Accordingly, the low point of the trajectory of the aircraft which is actually experienced will occur at a distance above the ground which may be expressed as $H_{min} = T_{GC}\dot{h}_T$. $T_D$ is the sum of the pilot reaction delay plus the ground clearance time factor, $T_{GC}$, and $\dot{h}_T$ is the sink rate at the time of warning.

The conditions for the warning situation illustrated in FIG. 1 are given by the trip equation:

$$h_T = \dot{h}_T[(\dot{h}_T/2ng) - T_D]$$

where $h_T$ is the altitude at which the warning occurs and n is the design pull-up factor.

FIG. 2 is a plot of the trip equation curve 15 with the warning altitude $h_T$ as the ordinate and the sink rate, $\dot{h}_T$, as the abscissa. So long as the altitude and sink rate of the aircraft place its operation in the zone 16 above the curve 15, no warning is given. However, when the operating conditions of the aircraft are located on or in the zone 17, below the curve, a warning occurs. The zone below the cure may be considered a warning zone.

Figure 3:
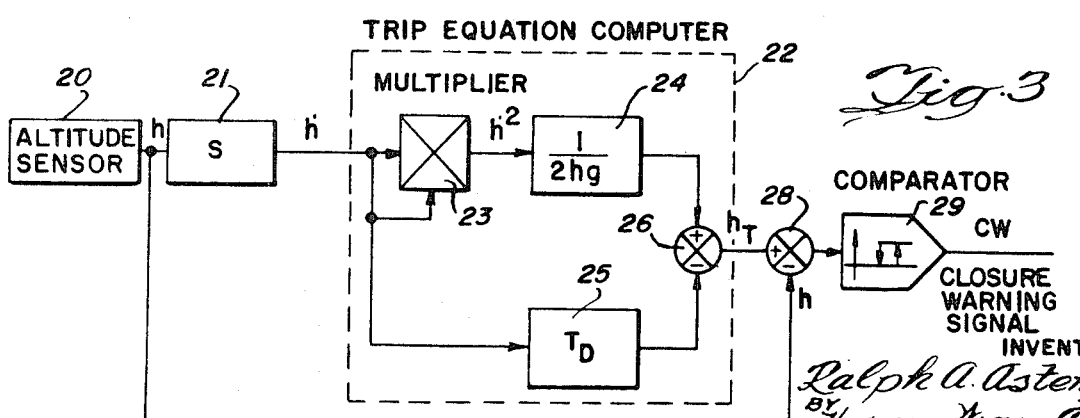
FIG. 3 is a functional block diagram of a warning system based on the curve of FIG. 2.

The block diagram of FIG. 3 illustrates a system for providing a proximity warning in accordance with the trip equation. An altitude sensor 20 has an output $h$ connected with a differentiator or rate circuit 21, the output of which is identified as $\dot{h}$. Trip equation computer 22 continuously calculates the warning altitude $h_T$ corresponding with the altitude rate condition of the aircraft. The computer includes a multiplier 23 with the altitude rate signal $\dot{h}$ connected to both its inputs. The output of the multiplier is $\dot{h}^2$. This signal is connected with an amplifier 24 having a gain of $1/(2ng)$. The altitude rate signal $\dot h$ is connected with amplifier 25 having a gain $T_D$. The outputs of the two amplifiers are combined at summing junction 26, the output of the summing junction being $(\dot h^2/2ng) - \dot h T_D$, or $h_T$.

The warning altitude signal $h_T$ is applied as a positive input to summing junction 28 while the output, $h$, of altitude sensor 20, is connected as a negative input to the summing junction. If the output of summing 28 is positive, it indicates that the aircraft is at an altitude below the warning altitude $h_T$. This condition is detected by comparator 29 which has an output CW, a "closure warn" signal. The transfer characteristic of comparator 29 has sufficient hysteresis, indicated by the diagram in the block, to avoid repeatedly switching in and out of a warn condition with small variations in the signals.

A radio altimeter used as the altitude sensor in the system of FIG. 3 would provide a-curate information concerning the distance of the aircraft above the ground, but the system would be subject to excessive false warnings when flying over rough terrain. A barometric altimeter would eliminate the rough ground false warnings but would not warn of a dangerous condition resulting from the aircraft traveling over rising ground. Furthermore, a barometric altimeter is subject to errors from incorrect zero setting and long term drift with barometric pressure changes. The system of FIG. 3, while theoretically accurate, cannot practically be implemented with either of the commonly used altitude measuring instruments.

FIG. 4 shows in block diagram form a complementary filter system for combining the outputs $h_R$ of radio altimeter 30 and $h_B$ of barometric altimeter 31. Rate circuits 32 and 33 differentiate the altitude signals from the radio and barometric altimeters 30 and 31, respectively, and have outputs $\dot h_R$ and $\dot h_B$ which are coupled to the inputs of complementary filter 34. The radio altitude rate signal $\dot h_R$ is connected through low pass filter section 35 and the barometric altitude rate signal $\dot h_B$ is connected through high pass filter section 36, the filtered signals being combined at summing junction 37 to provide a calculated altitude rate signal $\dot h_C$. The low pass filter has essentially an integrator characteristic while the high pass filter is essentially a differentiator or washout network. The time constant of complementary filter, $\tau_C$, is selected in accordance with the nature of the terrain characteristics over which the aircraft operates and the warning sensitivity which is desired. Of course, the more sensitive the warning is made, the greater the likelihood of the occurrence of a false warning with rough terrain. In practice, a time constant of the order of 1 to 5 seconds has been found satisfactory and, as will appear, the time constant may be made variable so that it can be adjusted for different operating conditions.

The curve of FIG. 4a illustrates the characteristic of low pass filter 35 as a function of the time duration of the signal. FIG. 4b illustrates the characteristic of high pass filter section 36, and FIG. 4c shows the calculated altitude rate signal $\dot h_C$.

Low pass filter section 35 reduces the relative effect of high frequency or short term rate changes in the radio altitude rate signal, resulting from ground surface discontinuities. The high pass filter section 36 eliminates the long term barometric altitude rate signal so that offset and drift errors are not introduced into the system.

It has been found, however, that even with the complementary filter the radio altitude rate signal $\dot h_R$ often has an amplitude sufficient to generate a false warning signal. Accordingly, a system based on the calculated altitude rate signal of FIG. 4 would in practice be unsatisfactory.

FIG. 5 is a block diagram of a preferred form of the warning system. As in FIG. 4, altitude signals $h_R$ and $h_B$ from radio and barometric altimeters 40 and 41 provide inputs to the system. In accordance with the invention, the radio altitude signal $h_R$ is differentiated by rate circuit 42 and the radio altitude rate signal $\dot h_R$ is connected with a rate limiter 43 which prevents the rate signal from exceeding an amplitude limit which may be selected in a manner to be described below. The output of the limiter, $\dot h_{RL}$, is connected with the input of a low pass filter section 44 of complementary filter 45. The barometric altitude signal $h_B$ is connected through rate circuit 46 and the barometric altitude rate signal $\dot h_B$ is connected through switch 47 with the input of high pass filter section 48. The filtered rate signals are combined at summing junction 49 and the calculated altitude rate signal $\dot h_C$ provides the input to trip equation computer 50.

A multiplier 52 in the trip equation computer has the altitude rate signal $\dot h_C$ connected with both inputs and having an output $\dot h_C^2$, as in FIG. 3. This signal is connected with amplifier 53 having a gain characteristic of $1/(2ng)$. The altitude rate signal is also connected with amplifier 54 having a gain characteristic $T_D$. The outputs of the two amplifiers are combined in the summing junction 55 to provide a signal $h_T$, the trip altitude for the altitude rate of the aircraft. An aircraft configuration sensor 56 controls the gains of amplifiers 53 and 54 in accordance with the aircraft pull-up characteristics for each configuration.

The calculated trip altitude is compared with the altitude of the aircraft with respect to the ground, to determine whether a closure warning should be given. The radio altitude signal $h_R$ is subtracted from the trip altitude signal $h_T$ at summing junction 57 and the difference is connected with comparator 58 which provides a closure warning signal with a positive input. The closure warning signal is connected with audio warning circuitry to be described below.

The rate limiter 43 eliminates, or at least substantially reduces, the false warnings resulting from radio rate signals caused by ground irregularities and the like. The rate limit is preferably set for operation as a function of the aircraft flight mode. For example, when the aircraft is in the final stage of a landing approach, descending toward the runway at a low altitude, it is particularly undesirable that a closure warning be given as a result of the radio altimeter sensing a ground surface irregularity, a building or the like. Accordingly, the amplitude rate limit is set at a lower level by limiter 43 in this operating condition, than when the aircraft is in a cruise mode and presumably is operating at an altitude where a higher closure rate can be experienced safely. In the embodiment of the system illustrated in FIG. 5, the rate limit of limiter 43 is selected in accordance with the position of the aircraft landing gear as determined by landing gear sensor 60. The transfer characteristic of the rate limiter shows two limiting levels, LGU and LGD, representing conditions of landing gear up and landing gear down, respectively.

The rate levels are preferably determined by the aircraft characteristics. In one embodiment of the system, the lower limit is set in accordance with the aircraft recovery characteristics, illustrated in the curve of FIG. 2. For example, a suitable limit is the sink rate corresponding with the minimum operating clearance altitude of the aircraft. The upper limit, effective except during landing approach, preferably corresponds with the maximum climb characteristics of the aircraft. If an aircraft cannot climb faster than 80 feet per second, for example, there is no need to sense a higher altitude rate.

Comparator 62 and switch 47 provide a cutout of the barometric altitude input during take-off and the initial portion of the aircraft climbout. During the take-off run of an airplane, air is compressed sets in front of and below the aircraft body and wings. The barometric altimeter senses an increased pressure and thus indicates a lower altitude. The signal $h_B$ would indicate that the plane was descending and a false warning would occur. This is at best annoying to the pilot during the take-off maneuver. Accordingly, comparator 62 senses the radio altitude $h_R$ and opens switch 47 when the plane is on the ground during the take-off run and during the initial portion of the climb-out. It has been found that the ground effect on the barometric altimeter is substantially dissipated by the time the aircraft reaches a height of 50 feet. When the comparator senses this height, switch 47 closes and remains closed until the plane lands. The transfer characteristic of the comparator is illustrated graphically in block 62.

Limiting the negative altitude rate signal avoids the occurrence of false warnings. However, it is preferable that the positive altitude rate signal also be limited to avoid the occurrence of a large signal which could charge a capacitor in the complementary filter network and temporarily block or overload the circuit.

Suitable circuitry for the radio altimeter rate circuit, limiter and the complementary filter is illustrated in FIG. 6. The radio altitude signal $h_R$ is connected from the altimeter (not shown) to terminals 65, 66, and is coupled through capacitor 67 and series resistor 68 with the negative input of operational amplifier 69. Diodes 70, 71, reversely connected from the amplifier input to a reference potential or ground 72, prevent overloading the amplifier with an excessive signal. The positive input of amplifier 69 is returned through resistor 73 to ground. The output of operational amplifier 69 is connected with a bridge limiter 75, biased to a desired operating level by a voltage divider including resistors 76, 77 which connect the bridge between positive and negative voltage supplies. A feedback network, capacitor 78 and resistor 79, is connected between the output of the bridge and the negative input of amplifier 69. Capacitor 67 provides a differentiating or rate characteristic for the amplifier and the time constant of the feedback network sets the differentiating time. A suitable time constant is 0.1 second.

The bias network for bridge limiter 75 is completed through resistor 81, connected from the bridge output to ground. The voltage relationship established in the bridge by the positive and negative voltage supplies and resistors 76, 77 and 81 establish the level at which the radio altitude rate signal is limited. When the landing gear of the aircraft is lowered, switch 82 closes connecting resistor 83 in parallel with resistor 81 and decreasing the limiting levels as described above.

Operational amplifier 85 provides the active element of the complementary filter. The amplifier has a direct feedback connection 86 from the output to the negative input. This operational amplifier configuration is sometimes referred to as an "unloading" amplifier; and it has the characteristic of substantially an infinite input impedance at the positive input.

The limited radio rate signal $\dot{h}_{RL}$ is connected with the positive amplifier input through a resistive network including potentiometer 87 and resistor 88. The barometric altitude rate signal $\dot{h}_B$ is connected with the positive input of amplifier 85 through capacitor 89. The resistive and capacitive input circuits together with the high impedance unloading amplifier provide both low pass filtering of the radio rate signal and high pass filtering of the barometric rate signal. For example, if the barometric rate signal is zero, resistors 87, 88 and capacitor 89 act as a simple integrator or low pass filter for the radio rate signal; and if the radio rate signal is zero, capacitor 89 and resistors 88, 87 serve as a high pass, washout or differentiator circuit for the barometric rate signal. The filtered signals are summed in the amplifier and the calculated altitude rate signal $\dot{h}_C$ is derived from output terminals 93, 94 connected with the output of amplifier 85.

The time constant $\tau$ of both sections of the complementary filter may be changed by varying a potentiometer 87.

Returning again to FIG. 5, a circuit is shown for supplementing the barometric altitude rate signal with a signal $A_N$ derived from a normal accelerometer 102. The barometric altitude signal $h_B$ is connected with the high pass filter section 103 of a complementary filter 104. The normal accelerometer signal is connected with low pass filter section 105. The two filtered signals are combined at summing point 106, providing a dynamic altitude rate signal $\dot{h}_D$ which may be substituted for the signal $\dot{h}_B$ as an input to the high pass filter section 48 of complementary filter 45. Further details of a dynamic altitude rate circuit may be found in FIG. 10 of Bateman et al. application Ser. No. 42,918, filed June 3, 1970, assigned to the assignee of this application.

The existence of a closure warning signal at the output of the comparator 58 actuates a novel audio signal generator which alerts the pilot to the condition of proximity to the ground. Briefly, an audio signal is modulated at a subaudio repetition rate, and the frequency, repetition rate and amplitude of the signal are selected in accordance with the relationship of the aircraft to the ground, to indicate to the pilot the nature of this relation.

The closure warning signal CW is connected with an audio logic circuit 110. AND circuit 111 has inputs of CW and CW ENABLE, a signal which indicates the integrity of the inputs to the ground proximity computer. With both signals available the output of AND gate 111 indicates a soft warn condition. This is a first warning criterion. A second warning criterion is provided by the aircraft altitude. When the aircraft is operating at an altitude of 500 feet or below, and a soft warning occurs, an output from AND gate 112 provides a hard warn signal, HW.

In audio generator 115, a frequency generator 116 has an output connected with a modulator 117 where it is amplitude modulated by the sawtooth output of a repetition rate generator 118. The modulated audio frequency is connected with audio amplifier 119, the output of which is connected to speaker 120 in the cockpit of the aircraft.

With a soft warn condition frequency generator 116 is operated at a frequency $f_1$, and amplifier 119 is set for a gain $A_1$. With a hard warn condition, frequency generator 116 operates a frequency $f_2$, repetition rate generator 118 and amplifier 119 at a gain $A_2$. In a specific embodiment of the system, the frequency $f_1$ is 400 Hertz. In the hard warn condition, the audio frequency $f_2$ is doubled to 800 cycles, and the amplitude level $A_2$ is 15 db higher than $A_1$. These changes of characteristics of the audio signal afford a clear distinction between the soft warn and the hard warn signal conditions.

The repetition rate generator is controlled by a signal $\dot{h}_p$, obtained from the output of summing junction 57, representing the penetration of the aircraft into the undesired operating zone 17 below curve 15 of FIG. 2. The degree of penetration of the undesired operating zone is a measure of the corrective action which should be taken. The signal $\dot{h}_p$ is connected with repetition rate generator 118 and varies the repetition rate.

The audio warn system described herein may, of course, be used to alert the operators of other machines to unsafe or undesirable operating conditions. Conversely, the signals CW, HW and $\dot{h}_p$ from the ground proximity warning system may be utilized to actuate other types of warnings, as lights, for example, to alert the pilot to the ground proximity condition.

I claim:

1. An instrument for determining the proximity condition of an aircraft with respect to the ground, comprising:
   means for generating a signal representing the altitude of the aircraft with respect to the ground;
   means responsive to said altitude signal for generating a signal representing the time rate of change of the aircraft altitude with respect to the ground;
   means responsive to said altitude rate signal, limiting the amplitude thereof;
   means for generating an aircraft barometric altitude signal;
   means responsive to said barometric altitude signal for generating a signal representing the time rate of change of the aircraft barometric altitude;
   means for combining long term components of the limited signal representing the time rate of change of the altitude of the aircraft with respect to the ground, and short term components of the signal representing the time rate of change of the barometric altitude of the aircraft, to develop a calculated aircraft altitude rate signal; and
   means for combining a function of the calculated altitude rate signal and a function of the signal representing the altitude of the aircraft with respect ground, providing a warning signal when the rate of approach of the aircraft toward the ground is excessive for the altitude of the aircraft with respect to the ground.

2. The instrument of claim 1 in which the amplitude limit of the altitude rate signal is adjustable.

3. The instrument of claim 2 in which said altitude rate limit is adjusted as a function of the flight mode of the aircraft.

4. The instrument of claim 2 including means sensing a characteristic of the aircraft configuration and means for adjusting the limiting amplitude of said aircraft altitude rate signal in accordance with the aircraft configuration.

5. The instrument of claim 1 wherein said altitude rate signal is of one polarity for a climb and of the other polarity for a descent and said limiting means limits signals of each polarity.

6. The instrument of claim 3 having a first altitude rate limit for landing approach and a second altitude rate limit for other flight modes.

7. The instrument of claim 6 in which the first limit for landing approach is selected in accordance with the recovery characteristics of the aircraft and the second limit for other flight modes, is selected in accordance with the maximum climb characteristics of the aircraft.

8. The instrument of claim 1 in which the means for combining the limited altitude rate signal with the barometric altitude rate signal to provide the calculated altitude rate signal is a complementary filter.

9. The instrument of claim 8 in which said complementary filter includes a low pass filter section having the limited altitude rate signal connected therewith, a high pass filter section having the barometric altitude rate signal connected thereto and means combining the outputs of said filter sections.

10. The instrument of claim 9 in which the transfer characteristic of said low pass filter is $1/(\tau_c s+1)$ and in which the transfer characteristic of the high pass filter is $\tau_c s/(\tau_c s+1)$.

11. The instrument of claim 10 in which the filter time constant, $\tau$, is adjustable.

12. The instrument of claim 11 in which the filter time constant, $\tau$, has a value of the order of 1 to 5 seconds.

13. The instrument of claim 8 wherein said complementary filter comprises:
   an operational amplifier having a positive input, a negative input and an output,
   a feedback circuit connecting the output of the operational amplifier to the negative input thereof for operation of the amplifier as an unloading amplifier with a high input impedance,
   a resistive circuit connecting said limited altitude rate signal with the positive input of said amplifier, and
   a capacitive circuit connecting said barometric altitude rate signal with the positive input of said amplifier, the resistive and capacitive circuits forming a low pass filter for the limited altitude rate signal and a high pass filter for the barometric rate signal.

14. The instrument of claim 1, including:
   means for disabling said barometric altitude signal generating means during take-off of the aircraft.

15. The instrument of claim 14 including means for maintaining the disabled condition of said barometric altitude signal generating means during the initial portion of a climb-out following take-off.

16. The instrument of claim 14 wherein said means for disabling the barometric altitude signal generating means includes means responsive to the signal representing the altitude of the aircraft with respect to the ground.

17. The instrument of claim 16 wherein said means for disabling the barometric altitude signal generating means includes means for comparing altitude of the aircraft with respect to the ground with a minimum altitude.

* * * * *